United States Patent
Hara

(10) Patent No.: US 9,884,528 B2
(45) Date of Patent: Feb. 6, 2018

(54) AUTONOMOUS DRIVING DEVICE

(71) Applicant: TOYOTA JIDOSHA KABUSHIKI KAISHA, Toyota-shi, Aichi-ken (JP)

(72) Inventor: Yasuhiro Hara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 9 days.

(21) Appl. No.: 15/202,230

(22) Filed: Jul. 5, 2016

(65) Prior Publication Data
US 2017/0068247 A1 Mar. 9, 2017

(30) Foreign Application Priority Data

Sep. 3, 2015 (JP) .................................. 2015-173486

(51) Int. Cl.
*B60D 1/24* (2006.01)
*G05D 1/02* (2006.01)
(Continued)

(52) U.S. Cl.
CPC ................. *B60D 1/24* (2013.01); *B60D 1/06* (2013.01); *B60D 1/485* (2013.01); *B60D 1/62* (2013.01); *B62D 13/00* (2013.01); *B62D 15/025* (2013.01); *G05D 1/0231* (2013.01); *G05D 2201/0213* (2013.01)

(58) Field of Classification Search
CPC . B60D 1/24; B60D 1/06; B60D 1/485; B60D 1/62; B62D 13/00; B62D 15/025; G05D 1/0231; G05D 2201/0213
See application file for complete search history.

(56) References Cited

U.S. PATENT DOCUMENTS

| 4,325,052 A | * | 4/1982 | Koerner | B60Q 11/007 |
| | | | | 250/206 |
| 5,544,944 A | * | 8/1996 | Keech | B62D 63/062 |
| | | | | 280/482 |

(Continued)

FOREIGN PATENT DOCUMENTS

JP 2002-331970 A 11/2002

*Primary Examiner* — Rodney A Butler
(74) *Attorney, Agent, or Firm* — Oliff PLC

(57) ABSTRACT

An autonomous driving device including: vehicle side surroundings information detecting sensors; a left-right pair of extensions provided to a towing device, the extensions extending further to a vehicle width direction outside than a vehicle width direction outside end portion of the towed vehicle; a left-right pair of device side surroundings information detecting sensors, the device side surroundings information detecting sensors being respectively provided to the left-right pair of extensions and detecting surroundings information; and a control device controlling travelling of the autonomous vehicle based on detection results of the vehicle side surroundings information detecting sensors, and, in cases in which the device side surroundings information detecting sensors are electrically connected to the control device, controlling travelling of the autonomous vehicle based on the surroundings information detected by the device side surroundings information detecting sensors in addition to surroundings information detected by the vehicle side surroundings information detecting sensors.

5 Claims, 4 Drawing Sheets

(51) Int. Cl.
*B60D 1/06* (2006.01)
*B60D 1/62* (2006.01)
*B62D 15/02* (2006.01)
*B62D 13/00* (2006.01)
*B60D 1/48* (2006.01)

(56) References Cited

U.S. PATENT DOCUMENTS

| | | | |
|---|---|---|---|
| 9,233,645 B2 * | 1/2016 | Schofield | B60C 23/00 |
| 9,527,394 B1 * | 12/2016 | Tang | B60L 11/1818 |
| 2006/0250225 A1 * | 11/2006 | Widmann | B60R 1/003 |
| | | | 340/438 |
| 2008/0161987 A1 * | 7/2008 | Breed | G08G 1/161 |
| | | | 701/27 |
| 2010/0020306 A1 | 1/2010 | Hall | |
| 2014/0277942 A1 * | 9/2014 | Kyrtsos | G01B 21/02 |
| | | | 701/41 |
| 2015/0105965 A1 * | 4/2015 | Blackwell | A01B 59/002 |
| | | | 701/28 |
| 2016/0054735 A1 * | 2/2016 | Switkes | G08G 1/22 |
| | | | 701/23 |
| 2016/0101811 A1 * | 4/2016 | Kyrtsos | B62D 15/0285 |
| | | | 701/25 |
| 2017/0011633 A1 * | 1/2017 | Boegel | G05D 1/0293 |

* cited by examiner

AUTONOMOUS DRIVING DEVICE

CROSS-REFERENCE TO RELATED APPLICATION

This application is based on and claims priority under 35 USC 119 from Japanese Patent Application No. 2015-173486 filed on Sep. 3, 2015, the disclosure of which is incorporated by reference herein.

BACKGROUND

Technical Field

The present invention relates to an autonomous driving device.

Related Art

US2010/0020306 describes technology related to a high definition LiDAR system that monitors in all directions, provided on a roof panel of a vehicle.

Japanese Patent Application Laid-Open (JP-A) No. 2002-331970 describes technology related to a towing device including a left-right pair of fixing members having a separation that corresponds to the width of left-right fixing members of a towing vehicle, a cross member that spans across the left-right pair of fixing members, and a hitching member to which a coupling member stretching forward from the trailer is swingably coupled. This related technology configures an attachment section for the cross member, the hitching member, and a base integrally formed to a connector that detachably couples together an electric cable at the towing vehicle side and an electric cable at the trailer side, and the base is attached to the cross member by a fixing device.

Here, in cases in which a towed vehicle is towed by a travelling autonomous vehicle whose travel is controlled based on surroundings information detected by a surroundings information detecting sensor, it is sometimes necessary to suspend the autonomous driving functionality entirely, or in part, due to the amount of surroundings information being insufficient.

For example, the amount of surroundings information regarding the vehicle rear side is insufficient when part of the detection range at the vehicle rear side of the surroundings information detecting sensor is obstructed by the towed vehicle. It is therefore necessary to suspend the autonomous driving functionality entirely, or in part, when towing.

SUMMARY

In consideration of the above, an object of the present invention is to provide an autonomous driving device capable of supplementing an insufficient amount of surroundings information regarding a vehicle rear side of an autonomous vehicle towing a towed vehicle.

A first aspect of the present invention provides an autonomous driving device including:

plural vehicle side surroundings information detecting sensors, the vehicle side surroundings information detecting sensors being provided to an autonomous vehicle, and detecting surroundings information;

a left-right pair of extensions provided to a towing device, the towing device being fixed to a rear end section of the autonomous vehicle and towing a towed vehicle, the extensions extending further to a vehicle width direction outside than a vehicle width direction outside end portion of the towed vehicle;

a left-right pair of device side surroundings information detecting sensors, the device side surroundings information detecting sensors being respectively provided to the left-right pair of extensions and detecting surroundings information; and a control device provided to the autonomous vehicle, the control device electrically connecting to the vehicle side surroundings information detecting sensors, and controlling travelling of the autonomous vehicle based on detection results of the vehicle side surroundings information detecting sensors, the control device also, in cases in which the device side surroundings information detecting sensors are electrically connected to the control device, controlling travelling of the autonomous vehicle based on the surroundings information detected by the device side surroundings information detecting sensors in addition to surroundings information detected by the vehicle side surroundings information detecting sensors.

According to the first aspect of the present invention, surroundings information regarding the vehicle rear side is detected by the device side surroundings information detecting sensors provided to the left-right pair of extensions of the towing device, which extend further to the vehicle width direction outside than the towed vehicle. Thus, during towing, the control device controls travelling of the autonomous vehicle based on the surroundings information detected by the device side surroundings information detecting sensors, in addition to the surroundings information detected by the vehicle side surroundings information detecting sensors. The amount of surroundings information regarding the vehicle rear side is therefore increased during towing. This enables an insufficient amount of information regarding the vehicle rear side of the autonomous vehicle towing the towed vehicle to be supplemented.

A second aspect of the present invention provides the autonomous driving device of the first aspect, further including:

a device side connector provided to an electrical line that transmits detection signals of the device side surroundings information detecting sensors; and a vehicle side connector that is provided to a rear end section of the autonomous vehicle, that is detachably connected to the device side connector, and that is electrically connected to the control device.

According to the second aspect of the present invention, the device side connector of the electrical line of the device side surroundings information detecting sensors is detachably connected to the vehicle side connector provided to the rear end section of the autonomous vehicle. Thus, the device side surroundings information detecting sensors and the control device can be easily connected together during towing, and, when not towing, these connections can be easily disengaged.

A third aspect of the present invention provides the autonomous driving device of the second aspect, wherein:

the towing device includes a cross member extending in the vehicle width direction;

an extending end portion of the cross member configures the extension to which the device side surroundings information detecting sensors are provided; and the electrical line is laid out within a cross-section of the cross member.

According to the third aspect of the present invention, the electrical line of the device side surroundings information detecting sensors is laid out within the cross-section of the cross member, thereby suppressing or preventing electromagnetic noise from penetrating into the electrical line. This suppresses or prevents the detection precision of the device side surroundings information detecting sensors from being lowered by electromagnetic noise.

According to the first aspect of the present invention, insufficient information regarding the vehicle rear side of the autonomous vehicle towing the towed vehicle can be supplemented.

According to the second aspect of the present invention, the device side surroundings information detecting sensors and the control device can be easily connected together during towing, and, when not towing, these connections can be easily disengaged.

According to the third aspect of the present invention, the detection precision of the device side surroundings information detecting sensors can be suppressed or prevented from being lowered by electromagnetic noise.

BRIEF DESCRIPTION OF THE DRAWINGS

Exemplary embodiments of the present invention will be described in detail based on the following figures, wherein.

DETAILED DESCRIPTION

Exemplary Embodiment

Figure 1:
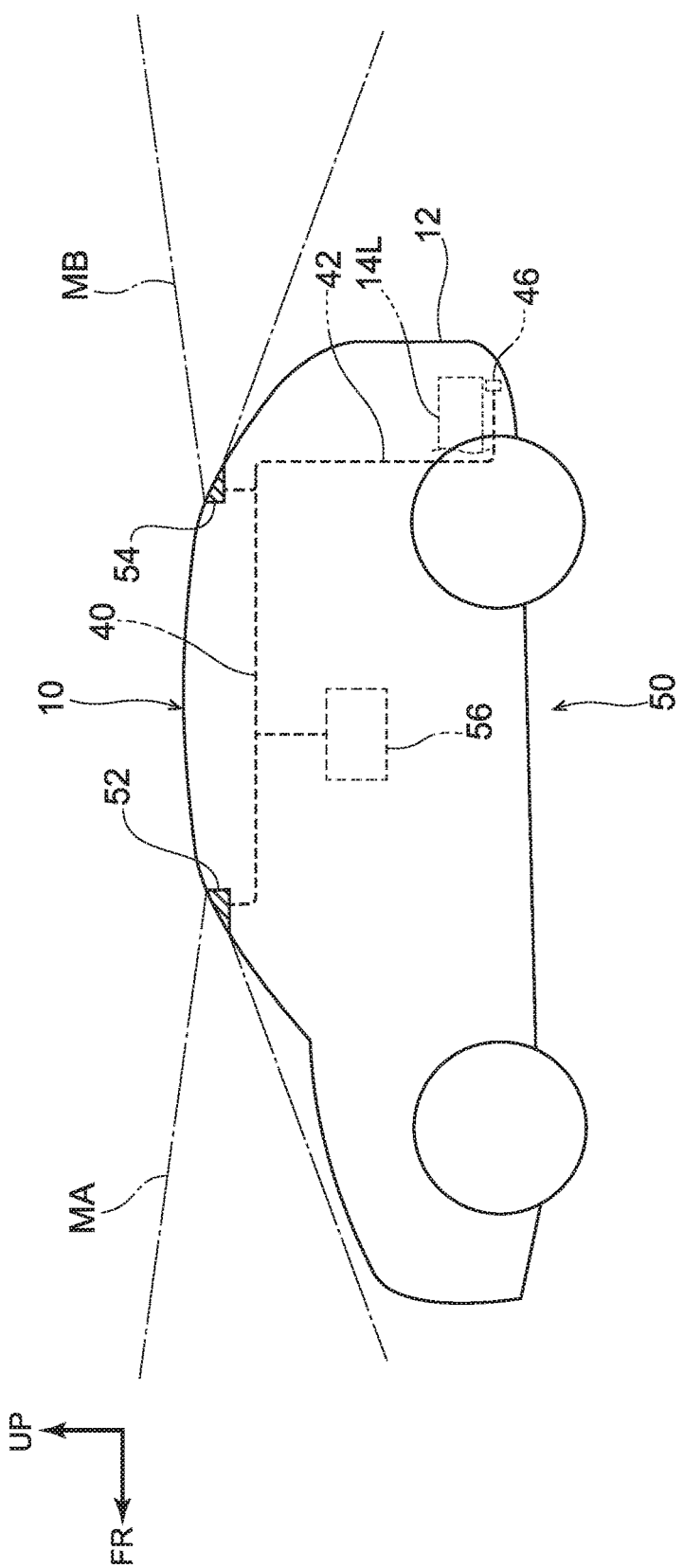
FIG. 1 is a side view of an autonomous vehicle provided with an autonomous driving device of an exemplary embodiment of the present invention.
Figure 2:
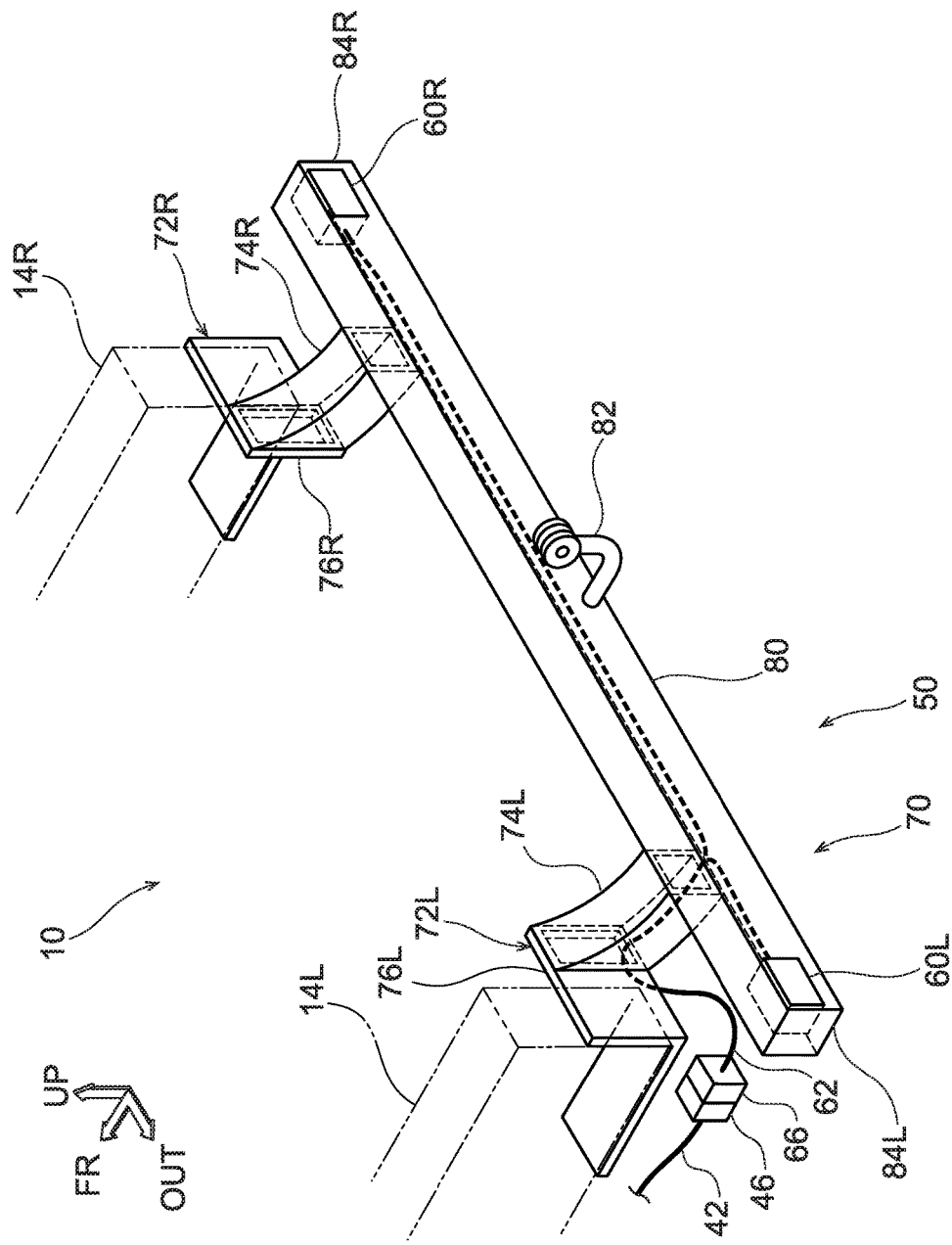
FIG. 2 is a perspective view of a towing device provided with an autonomous driving device of an exemplary embodiment of the present invention.

Explanation follows regarding an autonomous driving device according to an exemplary embodiment of the present invention, with reference to FIG. 1 to FIG. 3. In each of the figures, the arrow FR indicates a vehicle front-rear direction front side, the arrow UP indicates a vehicle up-down direction upper side, and the arrow OUT indicates a vehicle width direction outside of an autonomous vehicle where appropriate. Hereafter, unless specifically stated otherwise, front-rear, up-down, in-out, and left-right directions are used to refer to front-rear in the vehicle front-rear direction, up-down in the vehicle up-down direction, in-out in the vehicle width direction, and left-right in the vehicle width direction when facing in the direction of travel.

Autonomous Driving Device

First, explanation follows regarding an outline of an autonomous driving device 50.

Figure 3A:
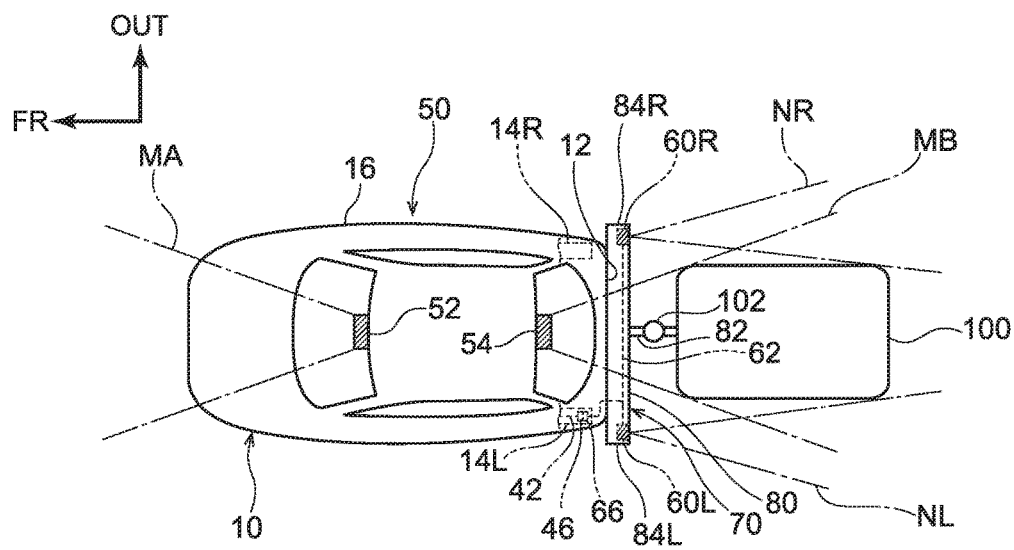
FIG. 3A is a plan view in a state in which the towing device of FIG. 2 is fixed to a rear end section of the autonomous vehicle of FIG. 1 and a towed vehicle is being towed.

As illustrated in FIG. 3A, the autonomous driving device 50 is configured including: a surroundings information detecting sensor 52 and a surroundings information detecting sensor 54 provided to an autonomous vehicle 10, described later; a surroundings information detecting sensor 60L and a surroundings information detecting sensor 60R provided to a towing device 70, described later; and a control device 56 illustrated in FIG. 3B.

A laser radar, a millimeter-wave radar, an ultrasonic wave sensor, an optical camera, or the like may be employed in the surroundings information detecting sensors 52, 54, 60L and 60R.

Autonomous Vehicle

Next, explanation follows regarding the autonomous vehicle 10.

As illustrated in FIG. 1, the control device 56, the surroundings information detecting sensor 52, and the surroundings information detecting sensor 54 that configure the autonomous driving device 50 are provided to the autonomous vehicle 10.

The surroundings information detecting sensor 52 is provided to a vehicle width direction central portion of a front end section of a vehicle upper portion of the autonomous vehicle 10, and the surroundings information detecting sensor 54 is provided to a vehicle width direction central portion of a rear end section of the vehicle upper portion of the autonomous vehicle 10. The surroundings information detecting sensor 52 of the front end section detects surroundings information regarding the front side of the autonomous vehicle 10, the surroundings information detecting sensor 54 of the rear end section detects surroundings information regarding the rear side of the autonomous vehicle 10.

Note that a detection range of the surroundings information detecting sensor 52 of the front end section is indicated by MA, and a detection range of the surroundings information detecting sensor 54 of the rear end section is indicated by MB.

The control device 56 is electrically connected to electric power steering (EPS), a brake electronic control unit (ECU), and the like, and is configured so as to control the travelling of the autonomous vehicle 10 based on the surroundings information detected by the surroundings information detecting sensors 52, 54, instead of a driver driving the autonomous vehicle 10.

In the present exemplary embodiment, configuration is made such that it is possible to switch between an autonomous driving mode, in which travelling of the autonomous vehicle 10 is controlled by the control device 56 based on the surroundings information detected by the surroundings information detecting sensors 52, 54, and a manual driving mode, in which the autonomous vehicle 10 is caused to travel by a driver personally operating a steering wheel, not illustrated in the drawings. In addition to these driving modes, drive assist modes such as fixed speed travelling on a high speed road, adaptive cruise control (ACC), or a lane keeping assist system (LKAS), that are based on the surroundings information detected by the surroundings information detecting sensors 52, 54, are also included.

The control device 56 and the surroundings information detecting sensors 52, 54 are electrically connected to each other by a wire harness 40. The wire harness 40 is installed between a metal framework member such as a roof side rail, not illustrated, and an outer plate.

An elongated harness 42 that configures the wire harness 40 is laid out reaching to a rear end section 12 of the autonomous vehicle 10, and a vehicle side connector 46 is provided to a leading end portion of the elongated harness 42. The vehicle side connector 46 is fixed to the back side of a bumper, not illustrated, at a width direction end portion of the rear end section 12 of the autonomous vehicle 10, and a device side connector 66 (see FIG. 2), described later, is detachably connected to the vehicle side connector 46.

A rear side bumper 14L and a rear side bumper 14R extending along the vehicle front-rear direction (see FIG. 2 and FIG. 3A) are provided at both vehicle width direction outer sides of a lower portion of a vehicle rear section of the autonomous vehicle 10. A fixing member 72L and a fixing member 72R of the towing device 70, described later, are fixed to rear end portions of the rear side bumpers 14L, 14R (see FIG. 2).

As illustrated in FIG. 3A, for aesthetic reasons, the autonomous vehicle 10 of the present invention is narrower in the vehicle width direction at the rear end section 12 than the vehicle front-rear direction central section 16.

Towing Device and Towed Vehicle

Next, explanation follows regarding the towing device 70 and a towed vehicle 100.

As illustrated in FIG. 2, the towing device 70 includes the left-right pair of fixing members 72L, 72R, a cross member 80, and a hook 82.

The fixing members 72L, 72R are provided at positions corresponding to the left-right rear side bumpers 14L, 14R of the autonomous vehicle 10. The fixing members 72L, 72R include arm portions 74L, 74R, and joining portions 76L, 76R provided to leading end portions of the arm portions 74L, 74R.

The arm portions 74L, 74R are tube-shaped members that are made from metal and curve so as to be convex on the lower side. The joining portions 76L, 76R are L shaped in side view as viewed along the vehicle width direction. The towing device 70 is fixed to the autonomous vehicle 10 by bolting the joining portions 76L, 76R to the rear side bumpers 14L, 14R.

The cross member 80, which extends in the vehicle width direction, is joined to the rear end portions of the arm portions 74L, 74R of the fixing members 72L, 72R. The cross member 80 is configured by a tube-shaped member made from metal. The hook 82 is provided to a vehicle width direction central portion of the cross member 80.

Figure 3B:
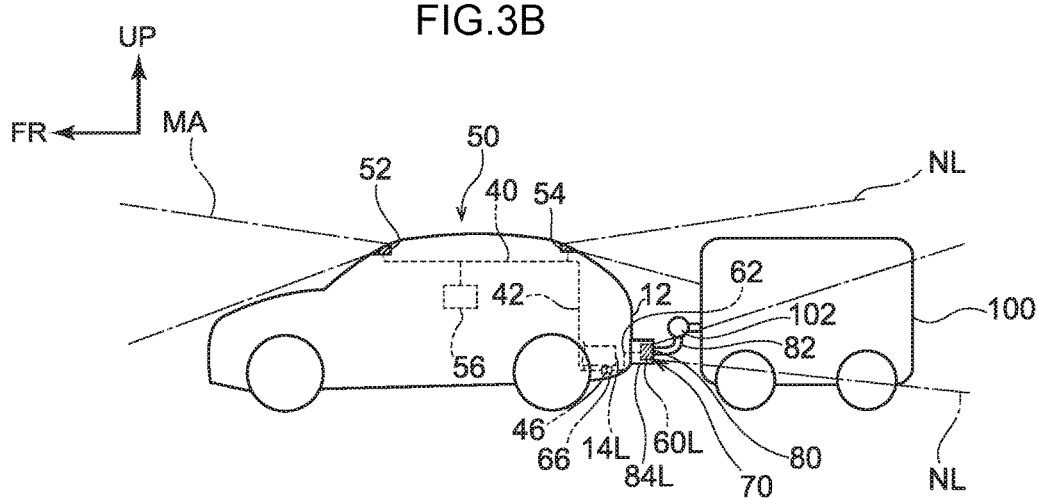
FIG. 3B is a side view viewed from a vehicle width direction outside in a state in which the towing device of FIG. 2 is fixed to a rear end section of the autonomous vehicle of FIG. 1 and a towed vehicle being towed.

As illustrated in FIG. 3A and FIG. 3B, a coupling member 102, provided to a front end of the towed vehicle 100, is coupled to the hook 82. As illustrated in FIG. 3A, both end portions 84L, 84R of the cross member 80 of the towing device 70 extend further to the outside than vehicle width direction outermost portions of the towed vehicle 100.

As illustrated in FIG. 2, the left-right pair of surroundings information detecting sensors 60L, 60R, which detect the surroundings information regarding the rear side, are respectively provided to the two end portions 84L, 84R of the cross member 80.

As illustrated in FIG. 3A, a detection range of the left side surroundings information detecting sensor 60L is indicated by NL, and a detection range of the right side surroundings information detecting sensor 60R is indicated by NR.

As illustrated in FIG. 2, a wire harness 62 stretching from the surroundings information detecting sensors 60L, 60R is laid out inside (within the cross-section of) the cross member 80, and is pulled out from the arm portion 74L after being laid out inside (within the cross-section of) the arm portion 74L of the left side fixing member 72L.

The device side connector 66 is provided to a leading end portion of the pulled out wire harness 62. The device side connector 66 is detachably connected to the vehicle side connector 46 of the rear end section 12 of the autonomous vehicle 10 (see FIG. 1), as described above.

In the control device 56 illustrated in FIG. 1 and FIG. 3B, the device side connector 66 is connected to the vehicle side connector 46 of the rear end section 12 of the autonomous vehicle 10. Configuration is made such that when a state is adopted in which the surroundings information detected by the surroundings information detecting sensors 60L, 60R of the towing device 70 have been input to the control device 56, the control device 56 controls traveling of the autonomous vehicle 10 based on the surroundings information detected by the surroundings information detecting sensors 60L, 60R of the towing device 70, in addition to the surroundings information detected by the surroundings information detecting sensors 52, 54 of the autonomous vehicle 10.

The control device 56 detects behavior of the towed vehicle 100 (especially behavior of the towed vehicle 100 when, for example, reversing, turning right, or turning left) using the surroundings information detecting sensor 54 of the autonomous vehicle 10 and the surroundings information detecting sensors 60L, 60R of the towing device 70, and also controls travelling of the autonomous vehicle 10 based on the detection results.

As illustrated in FIG. 3A, in the present exemplary embodiment, part of the detection range MB of the surroundings information detecting sensor 54 provided to the rear end section 12 of the autonomous vehicle 10 is obstructed by the towed vehicle 100.

Operation and Advantageous Effects

Next, explanation follows regarding operation and advantageous effects of the present exemplary embodiment.

When not towing, with the towing device 70 (see FIG. 2, FIG. 3A, and FIG. 3B) not fixed to the autonomous vehicle 10 illustrated in FIG. 1, and the towed vehicle 100 (see FIG. 3) not being towed, the control device 56 controls travelling of the autonomous vehicle 10 based on the surroundings information detected by the surroundings information detecting sensors 52, 54 provided to the autonomous vehicle 10 when in autonomous driving mode or drive assist mode.

During towing when the towing device 70 (see FIG. 3) is fixed to the autonomous vehicle 10 illustrated in FIG. 2 and the towed vehicle 100 is towed through the towing device 70, the control device 56 controls travelling of the autonomous vehicle 10 based on the surroundings information detected by the surroundings information detected by the surroundings information detecting sensors 60L, 60R of the towing device 70, in addition to the surroundings information detected by the surroundings information detecting sensors 52, 54 of the autonomous vehicle 10, when in autonomous driving mode or drive assist mode.

In other words, as described above, when a state has been adopted in which the device side connector 66 is connected to the vehicle side connector 46 of the rear end section 12 of the autonomous vehicle 10 and the surroundings information detected by the surroundings information detecting sensors 60L, 60R of the towing device 70 has been input to the control device 56, the control device 56 controls travelling of the autonomous vehicle 10 based on the surroundings information detected by the surroundings information detecting sensors 60L, 60R of the towing device 70, in addition to the surroundings information detected by the surroundings information detecting sensors 52, 54 of the autonomous vehicle 10.

The control device 56 detects behavior of the towed vehicle 100 (especially behavior of the towed vehicle 100 when, for example, reversing, turning right, or turning left) using the surroundings information detecting sensor 54 of the autonomous vehicle 10 and the surroundings information detecting sensors 60L, 60R of the towing device 70, and controls travelling of the autonomous vehicle 10 based on the detection results (the behavior of the towed vehicle 100).

Here, when it is assumed that the surroundings information detecting sensors 60L, 60R are not provided to the towing device 70, as illustrated in FIG. 3A, part of the detection range MB of the surroundings information detecting sensor 54 provided to the rear end section 12 of the autonomous vehicle 10 is obstructed by the towed vehicle 100 during towing, such that the amount of surroundings information regarding the rear side of the autonomous vehicle 10 and the towed vehicle 100 is insufficient. Autonomous driving functionality therefore sometimes needs to be suspended entirely or in part during towing.

However, in the present exemplary embodiment, the amount of surroundings information regarding the vehicle rear side is increased by employing the surroundings information detected by the surroundings information detecting sensors 60L, 60R of the towing device 70, and this supplements the insufficient amount of surroundings information.

As illustrated in FIG. 3A, the two end portions 84L, 84R of the cross member 80 of the towing device 70 extend further outside than the vehicle width direction outermost portions of the towed vehicle 100, and, as illustrated in FIG. 2, the surroundings information detecting sensors 60L, 60R are respectively provided to the two end portions 84L, 84R of the cross member 80. Namely, the surroundings information detecting sensors 60L, 60R are disposed further outside than the vehicle width direction outermost portions of the towed vehicle 100.

Thus, the detection range NL of the surroundings information detecting sensor 60L and the detection range NR of the surroundings information detecting sensor 60R are either not obstructed by the towed vehicle 100, or are obstructed by the towed vehicle 100 over a smaller range than in a hypothetical case in which the surroundings information detecting sensors 60L, 60R illustrated in FIG. 3A are disposed further inside than the vehicle width direction outermost portions of the towed vehicle 100, and surroundings information regarding the rear of the towed vehicle 100 can be detected. The amount of information regarding the vehicle rear side is therefore increased compared to cases in which the surroundings information detecting sensors 60L, 60R are disposed at the inside of the vehicle width direction outermost portions of the towed vehicle 100.

The amount of surroundings information regarding the rear side of the autonomous vehicle 10 and the towed vehicle 100 is therefore increased compared to cases lacking the surroundings information detecting sensors 60L, 60R, thereby supplementing the insufficient amount of information.

The control device 56 suspends the autonomous driving functionality entirely, or in part (for example, overtaking functionality), in cases in which it is determined that the amount of surroundings information regarding the vehicle rear side is insufficient for, for example, a length longer than the envisaged total length of the towed vehicle 100.

As illustrated in FIG. 2, the wire harness 62, which stretches from the surroundings information detecting sensors 60L, 60R, is laid out inside (within the cross-section of) the arm portion 74L of the metal fixing member 72L at the left side after being laid out inside (within the cross-section of) the cross member 80, which is made from an electrically conductive metal. Electromagnetic noise is thereby suppressed or prevented from penetrating to the wire harness 62, thereby suppressing or preventing electromagnetic noise from lowering the detection precision of the surroundings information detecting sensors 60L, 60R. The wire harness 62 is protected by the cross member 80 and the arm portion 74L, thereby suppressing or preventing damage to the wire harness 62.

The device side connector 66 of the surroundings information detecting sensors 60L, 60R of the towing device 70 are attachable to and detachable from the vehicle side connector 46 provided to the rear end section 12 of the autonomous vehicle 10. The surroundings information detecting sensors 60L, 60R of the towing device 70 and the control device 56 can therefore be easily connected together during towing, and, when not towing, these connections can be easily disengaged.

As illustrated in FIG. 3A, for aesthetic reasons, the autonomous vehicle 10 is narrower in the vehicle width direction at the rear end section 12 than at the vehicle front-rear direction central section 16. Although it is preferable to dispose the surroundings information detecting sensors 60L, 60R further toward the width direction outside in order to increase the surroundings information, there are limitations on the installation of the surroundings information detecting sensors 60L, 60R to the rear end section 12 of the autonomous vehicle 10.

In contrast, in the present exemplary embodiment, the surroundings information detecting sensors 60L, 60R are provided to the end portions 84L, 84R of the cross member 80 of the towing device 70, enabling the surroundings information detecting sensors 60R, 60L to be disposed further to the width direction outside.

Other

The present invention is not limited to the exemplary embodiment above.

For example, in the exemplary embodiment above, the wire harness 62 stretches from the surroundings information detecting sensors 60L, 60R, and is laid out inside (within the cross-section of) the arm portion 74L of the left side fixing member 72L after being laid out in the interior (within the cross-section of) the cross member 80; however, there is no limitation thereto. The wire harness 62 may be laid out in the interior (within the cross-section of) the cross member 80 and outside of the arm portion 74L. In such cases, the wire harness 62 is preferably covered by an electrically conductive protector, such as a metal.

Moreover, for example, in the present exemplary embodiment, the surroundings information detecting sensors 60L, 60R are respectively provided to the cross member 80 of the towing device 70 on the end portions 84L, 84R of the cross member 80, which extends further to the outside than the vehicle width direction outermost portions of the towed vehicle 100; however, there is no limitation thereto. The surroundings information detecting sensors 60L, 60R may be provided at positions extending further toward the vehicle width direction outside than the outermost portions of the towed vehicle 100 other than the cross member 80. Alternatively, an extension that extends further to the vehicle width direction outside than the outermost portions of the towed vehicle 100 may be joined as a separate component, and the surroundings information detecting sensors 60L, 60R may be provided to the extension of this separate component.

It goes without saying that various embodiments can be realized within a range not departing from the spirit of the present invention.

REFERENCE EXAMPLES

Next, explanation follows regarding reference examples. Members similar to those of the exemplary embodiment above are allocated the same reference numerals, and duplicate explanation is omitted.

First Reference Example

Figure 4:
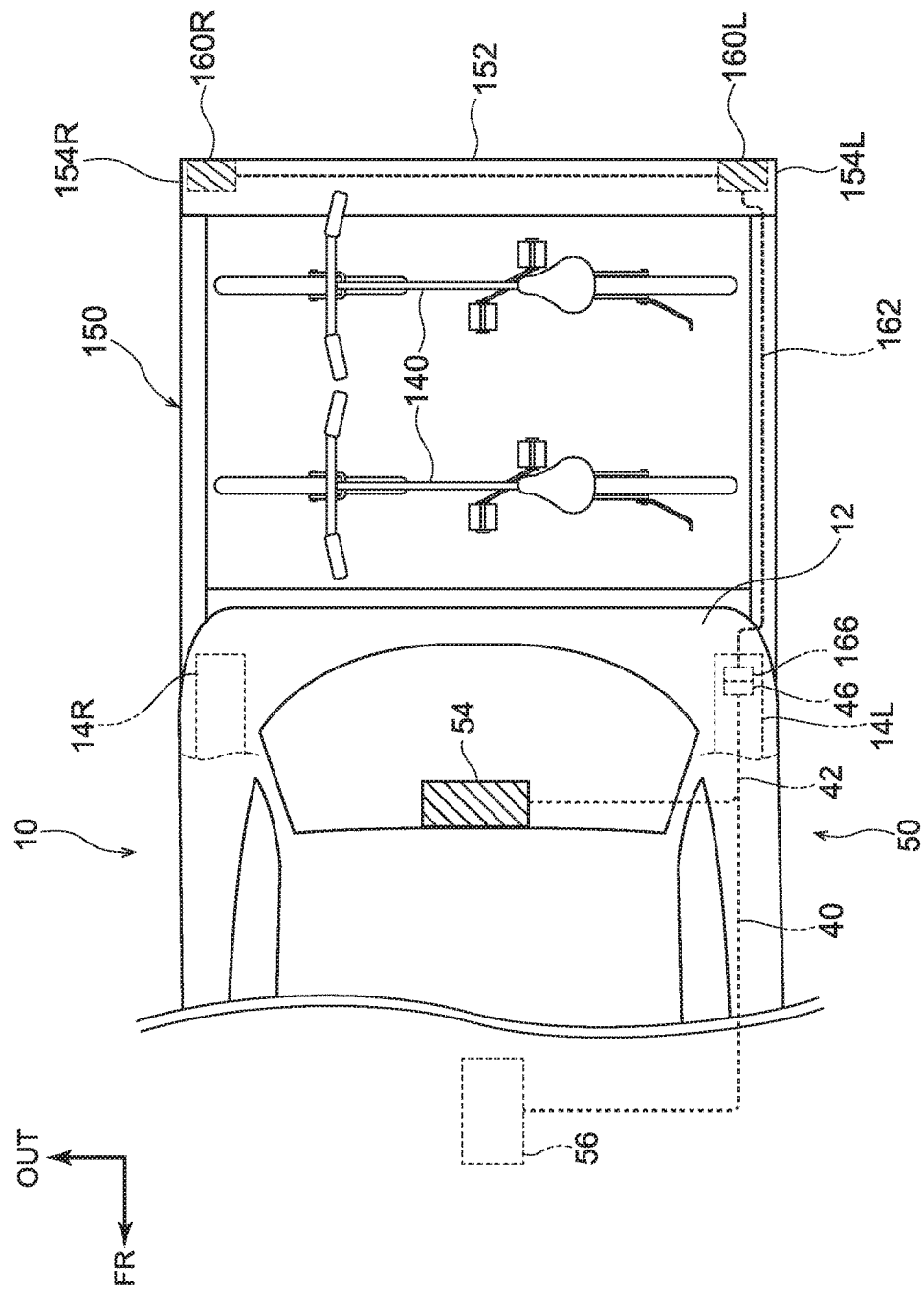
FIG. 4 is a plan view in a state in which a cycle carrier of a reference example is fixed to a rear end section of an autonomous vehicle.

As illustrated in FIG. 4, a cycle carrier 150 is fixed to the rear end section 12 of the autonomous vehicle 10 as an example of a rear carrier. Bicycles 140 are loaded onto the cycle carrier 150.

Part of the detection range MB of the surroundings information detecting sensor 54 provided to the rear end section 12 of the autonomous vehicle 10 (see FIG. 2) is obstructed by the bicycles 140 loaded onto the cycle carrier 150.

A tube-shaped cross member 152, which is made from metal and extends along the vehicle width direction, is provided to a rear end section of the cycle carrier 150. Surroundings information detecting sensors 160R, 160L are respectively provided to width direction end portions 154L, 154R of the cross member 152.

A wire harness 162 stretching from the surroundings information detecting sensors 160L, 160R is laid out along a left side portion of the cycle carrier 150 after being laid out in the interior (within the cross-section of) the cross member 152. A carrier side connector 166 is provided to a leading end portion of the wire harness 162. The carrier side connector 166 is detachably connected to the vehicle side connector 46 of the rear end section 12 of the autonomous vehicle 10.

Moreover, configuration is made such that when a state is adopted in which the carrier side connector 166 is connected to the vehicle side connector 46 of the rear end section 12 of the autonomous vehicle 10 and surroundings information detected by the surroundings information detecting sensors 160L, 160R of the cycle carrier 150 has been input to the control device 56, the control device 56 controls travelling of the autonomous vehicle 10 based on the surroundings information detected by the surroundings information detected by the surroundings information detecting sensors 160L, 160R of the cycle carrier 150, in addition to the surroundings information detecting sensor 52 (see FIG. 1) and the surroundings information detecting sensor 54 of the autonomous vehicle 10.

Operation and Advantageous Effects

Next, explanation follows regarding operation and advantageous effects of the first reference example.

Part of the detection range MB of the surroundings information detecting sensor 54 provided to the rear end section 12 of the autonomous vehicle 10 (see FIG. 2) is obstructed by the bicycles 140 loaded onto the cycle carrier 150.

However, when a state has been adopted in which the carrier side connector 166 is connected to the vehicle side connector 46 of the autonomous vehicle 10 and surroundings information detected by the surroundings information detecting sensors 160L, 160R of the cycle carrier 150 has been input to the control device 56, the control device 56 controls travelling of the autonomous vehicle 10 based on the surroundings information detected by the surroundings information detecting sensors 160L, 160R of the cycle carrier 150, in addition to the surroundings information detected by the surroundings information detecting sensor 52 (see FIG. 1) and the surroundings information detecting sensor 54 of the autonomous vehicle 10.

The amount of surroundings information regarding the rear side of the autonomous vehicle 10 and the cycle carrier 150 is therefore increased compared to cases lacking the surroundings information detecting sensors 160L, 160R, supplementing for the insufficient amount of information.

Moreover, the wire harness 162 stretching from the surroundings information detecting sensors 160L, 160R are laid out in the interior (within the cross-section of) of the cross member 152, which made from an electrically conductive metal, such that electromagnetic noise is suppressed or prevented from penetrating to the wire harness 162. The detection precision of the surroundings information detecting sensors 160L, 160R is thus suppressed or prevented from being lowered by electromagnetic noise.

The carrier side connector 166 of the surroundings information detecting sensors 160L, 160R of the cycle carrier 150 is detachably connected to the vehicle side connector 46 of the rear end section 12 of the autonomous vehicle 10. Thus, the surroundings information detecting sensors 160L, 160R of the cycle carrier 150 and the control device 56 can be easily connected together when the cycle carrier 150 is fixed, and these connections can be easily disengaged when the cycle carrier 150 is unfixed.

Although the surroundings information detecting sensors 160R, 160L are provided to the width direction end portions 154L, 154R of the cross member 152 of the rear end section of the cycle carrier 150 in the present reference example, there is no limitation thereto. The surroundings information detecting sensors 160R, 160L may be provided to the cycle carrier 150 at another position. Moreover, a single surroundings information detecting sensor, or three or more surroundings information detecting sensors, may be provided to the cycle carrier 150.

Second Reference Example

Although drawings are not provided, one or plural surroundings information detecting sensors are provided to the rear end section of the towed vehicle 100 (see FIG. 3A, FIG. 3B) in the second reference example. The surroundings information detecting sensors are electrically connected to the control device 56 of the autonomous vehicle 10 (see FIG. 3).

During towing, the control device 56 controls travelling of the autonomous vehicle 10 based on the surroundings information detected by the surroundings information detecting sensor of the towed vehicle 100, in addition to the surroundings information detected by the surroundings information detecting sensors 52, 54 in the autonomous vehicle 10.

Behavior of the towed vehicle 100 is also detected by the surroundings information detecting sensor 54 of the autonomous vehicle 10, and travelling of the autonomous vehicle 10 is controlled based on the detection result.

Moreover, the position of the surroundings information detecting sensor of the towed vehicle 100 changes due to the behavior of the towed vehicle 100, for example, reversing, turning right, or turning left. Thus, the control device 56 corrects for the position of the surroundings information detecting sensor of the towed vehicle 100 based on the detection results of the towed vehicle 100 using the surroundings information detecting sensor 54 of the autonomous vehicle 10, or with reference to objects on the road (for example, utility poles).

A towed side connector is provided to a wire harness leading end portion stretching from the surroundings information detecting sensor of the towed vehicle 100. The towed side connector is detachably connected to the vehicle side connector 46 of the rear end section 12 of the autonomous vehicle 10 (see FIG. 1).

Operation and Advantageous Effects

Next, explanation follows regarding operation and advantageous effects of the second reference example.

The control device 56 controls travelling of the autonomous vehicle 10 based on the surroundings information detected by the surroundings information detecting sensor of the towed vehicle 100, in addition to the surroundings information detected by the surroundings information detecting sensors 52, 54 of the autonomous vehicle 10.

Moreover, the control device 56 corrects for the position of the surroundings information detecting sensor of the towed vehicle 100 based on the detection results of the towed vehicle 100 using the surroundings information detecting sensor 54 of the autonomous vehicle 10, or with reference to objects on the road (for example, utility poles).

Moreover, the towed side connector of the surroundings information detecting sensor of the towed vehicle 100 is configured so as to be attachable to, or detachable from, the vehicle side connector 46 of the rear end section 12 of the autonomous vehicle 10. The surroundings information detecting sensor of the towed vehicle 100 and the control device 56 can therefore be easily connected together during towing, and, when not towing, these connections can be easily disengaged.

What is claimed is:

1. An autonomous driving device comprising:
    a plurality of vehicle side surroundings information detecting sensors that are provided to an autonomous vehicle, and that detect surroundings information;
    a left-right pair of extensions that are fixed to a rear end section of the autonomous vehicle, that are provided to a towing device towing a towed vehicle, and that extend further to a vehicle width direction outside than a vehicle width direction outside end portion of the towed vehicle;
    a left-right pair of device side surroundings information detecting sensors that are respectively provided to the left-right pair of extensions, that are disposed further outside than the vehicle width direction outermost portions of the towed vehicle, and that detect surroundings information; and
    a control device that is provided to the autonomous vehicle, that electrically connects to the vehicle side surroundings information detecting sensors, and that controls travelling of the autonomous vehicle based on detection results of the vehicle side surroundings information detecting sensors, the control device also, in cases in which the device side surroundings information detecting sensors are electrically connected to the control device, controlling travelling of the autonomous vehicle based on the surroundings information detected by the device side surroundings information detecting sensors in addition to surroundings information detected by the vehicle side surroundings information detecting sensors.

2. The autonomous driving device of claim 1, further comprising:
    a device side connector provided to an electrical line that transmits detection signals of the device side surroundings information detecting sensors; and
    a vehicle side connector, the vehicle side connector being provided to a rear end section of the autonomous vehicle, being detachably connected to the device side connector, and being electrically connected to the control device.

3. The autonomous driving device of claim 2, wherein:
    the towing device includes a cross member extending in the vehicle width direction;
    an extending end portion of the cross member configures the extension to which the device side surroundings information detecting sensors are provided; and
    the electrical line is laid out within a cross-section of the cross member.

4. The autonomous driving device of claim 1, wherein:
    the plurality of vehicle side surroundings information detecting sensors include
    a first surroundings information detecting sensor provided to a vehicle width direction central portion of a front end section of a vehicle upper portion of the autonomous driving device, and
    a second surroundings information detecting sensor provided to a vehicle width direction central portion of a rear end section of a vehicle upper portion of the autonomous vehicle.

5. The autonomous driving device of claim 4, wherein behavior of the towed vehicle is detected by the second surroundings information detecting sensor of the autonomous vehicle and the surroundings information detecting sensor of the towing device, and the control device controls travelling of the autonomous vehicle based on the detection result.

\* \* \* \* \*